US006716473B2

(12) United States Patent
Bodnar et al.

(10) Patent No.: US 6,716,473 B2
(45) Date of Patent: Apr. 6, 2004

(54) MICROEMULSIONS

(75) Inventors: Igor Bodnar, Vlaardingen (NL);
Eckhard Flöter, Vlaardingen (NL);
Wim Hogervorst, Vlaardingen (NL);
Cornelis Willem Van Oosten,
Vlaardingen (NL)

(73) Assignee: Unilever Bestfoods North America, division of Conopco, Inc., Englewood Cliffs, NJ (US)

( * ) Notice: Subject to any disclaimer, the term of this patent is extended or adjusted under 35 U.S.C. 154(b) by 216 days.

(21) Appl. No.: 10/055,071

(22) Filed: Jan. 23, 2002

(65) Prior Publication Data
US 2002/0098275 A1 Jul. 25, 2002

(30) Foreign Application Priority Data
Jan. 25, 2001 (EP) .............................. 01200250

(51) Int. Cl.⁷ ................................. A23D 9/007
(52) U.S. Cl. .................... 426/602; 426/611; 426/612
(58) Field of Search ................... 426/602, 611, 426/612

(56) References Cited
U.S. PATENT DOCUMENTS 5,045,337 A 9/1991 El-Nokaly et al.
6,077,559 A * 6/2000 Logan et al. ............... 426/650
6,149,954 A * 11/2000 Merabet ..................... 426/100

FOREIGN PATENT DOCUMENTS

| EP | 0657104 | * | 6/1995 |
| EP | 0 657 104 A1 | | 6/1995 |
| GB | 2 297 759 A | | 8/1996 |
| GB | 2297759 | * | 8/1996 |
| WO | 99/59422 | | 11/1999 |
| WO | 99/62357 | | 12/1999 |
| WO | 99/63841 | | 12/1999 |

OTHER PUBLICATIONS

Grant, J. 1969 Hackh's Chemical Dictionary McGraw–Hill Book Company New York p. 41.*

"Preparing Nontoxic Microemulsions"; Kahlweft et al.; *The ACS Journal Of Surfaces and Colloids*, vol. 11; No. 11; Nov. 1995.

* cited by examiner

*Primary Examiner*—Carolyn Paden
(74) *Attorney, Agent, or Firm*—Gerard J. McGowan, Jr.

(57) ABSTRACT

An edible water-in-oil microemulsion that is transparent or translucent in appearance and comprises oil, a surfactant, a cosurfactant or cosolvent and a water phase comprising water and optional water-soluble components; the oil comprises from 25 to 97 wt % diglycerides relative to the total weight of glycerides.

22 Claims, No Drawings

MICROEMULSIONS

FIELD OF THE INVENTION

The present invention relates to edible water-in-oil microemulsions that are transparent or translucent in appearance.

BACKGROUND OF THE INVENTION

A microemulsion is considered to be a thermodynamically or kinetically stable liquid dispersion of an oil phase and a water phase, in combination with a surfactant. The dispersed phase typically comprises small particles or droplets, with a size range of 5 nm–200 nm, giving rise to a microemulsion that is transparent or translucent in appearance. This is in contrast to regular (macro-) emulsions that are turbid. The droplets or particles of the microemulsion may be spherical, although other structures are possible. The microemulsion is formed readily and sometimes spontaneously, generally without high-energy input. In many cases a cosurfactant or cosolvent is used in addition to the surfactant, the oil phase and the water phase.

Water-in-oil microemulsions have the advantage, due to their stability, of a long shelf life. Moreover, as the water phase droplets are usually extremely small, the microemulsions have good microbiological stability. This is in contrast to regular emulsions where the presence of water droplets can present a severe microbiological problem. Microemulsions also enable the water phase to be dispersed homogeneously throughout the oil phase without the necessity of using a structurant, since no phase separation will occur.

It is desirable to be able to prepare edible water-in-oil microemulsions for use as, or in, food products, which microemulsions comprise oils obtainable from readily available natural sources (eg. vegetable oils). In addition or in the alternative, it is desirable to prepare edible water-in-oil microemulsions that contain relatively large amounts of water. The inclusion of water reduces the calorific value of the microemulsion and enables the inclusion of water-soluble components, such as flavours, vitamins, salts, sugars, colorants and fragrances, to the benefit of the food product being or containing the microemulsion.

However, edible microemulsions are not easy to prepare, particularly those containing relatively large amounts of water and/or containing oils obtainable from natural sources.

In the prior art, Kahlweit et al (Langmuir, 11, 11, 4185, 1995) discloses an edible microemulsion using n-alkane-1, 2-diols as cosurfactant and lecithin as surfactant. The oil phase is an oleic acid ethyl ester or iso-propylmyristate. It is therefore not based on readily available oils from natural sources like vegetable oil.

U.S. Pat. No. 5,045,337 relates to a water-in-oil microemulsion comprising a polyglycerol ester. The microemulsion contains up to 5% water or other polar solvent. The surfactants disclosed are polyglycerols in general, with restrictions to the amounts of mono-, di-, tri-, and tetraglycerols. The total amount of surfactants is limited to 10%. A stated object of the invention is to make a microemulsion which is free of a cosurfactant such as an alcohol or acid.

GB2297759 describes microemulsions that may be used in foodstuffs. It refers to the microemulsions of U.S. Pat. No. 5,045,337 by stating that it is important to minimise the amount of surfactant used to stabilise a given amount of water. The surfactant used in GB2297759 is a polyglycerol ester of an unsaturated fatty acid having from 12 to 24 carbon atoms. The polyglycerol component of the polyglycerol ester has at least 70% by weight of triglycerols or tetraglycerols. In GB2297759 the weight ratio of surfactant to water in the microemulsion is stated to be as low as 5:1 and the amount of water in the microemulsion is preferably less than 2% by weight. Thus, the microemulsion disclosed is not very efficient at solubilising water.

EP0657104 relates to edible water-in-oil microemulsions containing up to 33% water. The surfactants disclosed are diglyceride esters with a strong polar hydrophilic head group in combination with a monoglyceride. Examples of these surfactants are phospholipids, citrates, tartrates and lactilates. The oil phase comprises triglycerides. Various oils including sunflower oil and medium chain triglycerides are exemplified. Generally, the amounts of surfactants are rather high. A reasonably high water:surfactant ratio is obtained only with the use of medium chain triglycerides.

WO99/62357 discloses flavour-releasing compositions comprising water-in-oil microemulsion droplets and/or hydrated reverse micelles containing latent flavours. The compositions may be used as flavour delivery systems in foodstuffs, where the active flavour may be produced by the action of an enzyme. In the preferred embodiments the mole ratio of water to surfactant is preferably less than 10, and preferably less than 5. These systems are therefore better described as hydrated reverse micelles rather than microemulsions. In the single example, a microemulsion containing 3.0% water is prepared.

WO99/59422 discloses a water-in-oil emulsified fat composition containing specific diglycerides in a high concentration and suitable for use as a margarine or fat spread. The oil phase comprises 40–95 wt % diglycerides and 5–60 wt % triglycerides. The diglycerides are defined in terms of the levels and types of their saturated and unsaturated fatty acid groups. The diglycerides generally have a melting point of 20 C., preferably 30 C., in order to make a spreadable margarine or spread. A wide range of emulsifying agents is disclosed including lecithins. Nothing is mentioned about the formation of microemulsions or transparent emulsions.

SUMMARY OF THE INVENTION

The present invention seeks to provide an edible water-in-oil microemulsion that is transparent or translucent in appearance and that contains relatively large amounts of water.

The present invention also seeks to provide an edible water-in-oil microemulsion that is transparent or translucent in appearance and that contains oil obtainable from natural sources.

According to the present invention there is provided an edible water-in-oil microemulsion that is transparent or translucent in appearance, the microemulsion comprising oil, a surfactant, a cosurfactant or cosolvent and a water phase comprising water and optional water-soluble components; wherein the oil comprises from 25 to 97 wt % diglycerides relative to the total weight of glycerides.

DETAILED DESCRIPTION OF THE INVENTION

Whereever oil is mentioned herein it includes oil and fat and mixtures thereof.

Preferably the oil comprises from 50 to 85 wt % diglycerides.

The microemulsion may comprise from 40 to 97 wt % oil. The microemulsion may comprise from 1 to 40 wt % surfactant, preferably from 2 to 25 wt % surfactant. The microemulsion may comprise from 0.1 to 25 wt % water phase, preferably from 1 to 15 wt % water phase. The microemulsion may comprise 0 to 30 wt % cosurfactant or cosolvent, preferably from 0.1 to 10 wt % cosurfactant or cosolvent.

In a preferred embodiment, the mole ratio of water phase to surfactant is in the range of from 5 to 70.

Diglycerides are di-esters of glycerol with fatty acids. Diglycerides have the following formulae:

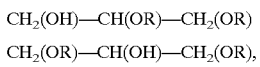

CH$_2$(OH)—CH(OR)—CH$_2$(OR)

CH$_2$(OR)—CH(OH)—CH$_2$(OR), where R is the same or different acyl group. The acyl groups may have saturated, unsaturated, branched, or linear hydrocarbon chains.

Surfactants used according to the invention are known surfactants that are edible and that are capable of forming a microemulsion in compositions according to the invention. Preferable surfactants are monoglyceride esters or diglyceride esters. Especially preferred surfactants are phospholipids and mono- or diglyceride esters of citric acid, tartaric acid and lactic acid. Most preferred surfactants are phospholipids and mono- or diglyceride esters of citric acid or combinations thereof. In one example, the surfactant is lecithin.

The cosurfactant is preferably a non-toxic, amphiphilic molecule such as an alcohol (for example ethanol), an acid (for example acetic acid), an ester (for example butyl lactate) or mixtures thereof. Preferably this non-toxic, amphiphilic molecule has a molecular weight of less than 300.

The cosurfactant or cosolvent has the effect of broadening the ranges of component concentrations for forming stable microemulsions. Moreover, the cosurfactant or cosolvent can be used as a flavour, taste modifier, colourant, preservative, or otherwise functional additive.

Typically, water-soluble components such as dairy products, proteins, peptides, salts, sugars, sweeteners, flavouring agents, flavour precursors, nutrients, vitamins, minerals, acids, seasonings, and anti-oxidants are present.

Preferably, the microemulsion comprises one or more salts. The presence of the cosurfactant is useful for incorporating large amounts of salt, for example 0.2 M in aqueous phase or higher.

The present invention relates to a microemulsion in which a relatively large amount of water may be dispersed in oil. This oil comprises diglycerides. These diglycerides are preferably derived from an oil of natural origin, although the oil can be derived from plants or animals or can be synthetic.

In addition to diglycerides, the oil of the microemulsion may comprise triglycerides and monoglycerides.

To derive the diglycerides, a glycerolysis-step may be used to convert chemically or enzymatically a natural triglyceride into a mixture of monoglycerides, diglycerides and triglycerides. This mixture of mono-, di- and triglycerides may be used as the oil in the microemulsion of the present invention, although the presence of the mono- and triglycerides is not essential. Another way to obtain diglycerides is through acidolysis of glycerol.

The oil may be glycerolysed oil, for example glycerolysed butterfat oil, glycerolysed sunflower oil or glycerolysed coconut oil. Another example of a suitable oil is commercially-available Ekona-oil. This oil consists of 83% diglycerides and 17% triglycerides. It is available from KAO Corporation of Japan. Preferable oils generally comprise a higher proportion of diglycerides than any monoglycerides or triglycerides present. The oil may also comprise fat-like polymers such as sucrose polyesters, for example when used in low-calorie food products.

To prepare the microemulsion, any water-soluble components are dissolved in water and the oil-soluble components such as lecithin are dissolved in oil. If any of the ingredients are solids, these are first added to a liquid phase in which they are soluble and possibly heated to dissolve them. Any undissolved material is separated by centrifugation or filtration. The oil and water phases are then mixed in a suitable vessel, and given time to equilibrate. Standard emulsification techniques, like stirring, use of membranes, applying shear, ultrasound and the like, can be used to facilitate the mixing of the two phases.

Thus, according to another aspect of the present invention there is provided a process for preparing a microemulsion in accordance with the present invention comprising the following steps:

a) preparing a water phase, including dissolving any water-soluble components in water;

b) preparing an oil phase, including dissolving any oil-soluble components in oil;

c) emulsifying the oil and water phases.

The microemulsion may be used as or in food products such as dressings and liquid margarines. It is preferably pourable. In addition to the microemulsion, the food product may comprise a dispersed visible phase, such that the resulting product is partially transparent.

The present invention relates to a microemulsion in which a relatively large amount of water may be dispersed in oil. This oil comprises diglycerides. These diglycerides are preferably derived from an oil of natural origin.

To derive the diglycerides, a glycerolysis-step may be used to chemically or enzymatically convert a natural triglyceride into a mixture of monoglycerides, diglycerides and triglycerides. This mixture of mono-, di- and triglycerides may be used as the oil in the microemulsions of the present invention, although the presence of the mono- and triglycerides is not essential.

Embodiments of the present invention will now be described, by way of example only.

EXAMPLES

Example 1

9 g of lecithin (Epikuron 200 from Lucas Meyer) was added to 77.5 g of Ekona-oil and 8 g of ethanol. Ekona-oil was obtained from KAO Corporation of Japan and consisted of 83% long-chain diglycerides and 17% triglycerides. To this mixture was added 5.5 g 1 M CaCl$_2$.

A transparent microemulsion was obtained. It contained 5% water phase. The mole ratio of water to surfactant was 28.

Example 2

To a mixture of 1% acetic acid in Ekona-oil and 8% lecithin was added 4% of a water phase comprising 0.2M NaCl.

A transparent microemulsion was obtained. It contained 4% water phase. The mole ratio of water to surfactant was 21.

Example 3

A water phase comprising 4% lactose and 4% NaCl was added to an oil phase consisting of 10% lecithin, 8% ethanol and 82% Ekona-oil to form a microemulsion. The ratio of water phase to oil phase was 1:20.

A transparent microemulsion was obtained. The mole ratio of water to surfactant was 18.

Example 4a

Preparation of glycerolysed Sunflower oil.

In a 4000 ml three-necked flask, equipped with thermometer and glass overhead stirrer, 2900.6 gram sunflower oil was added to 301.4 gram glycerol and heated. When the mixture reached a temperature of about 210 C., 3.25 gram sodium stearate was added as a catalyst. The reaction mixture was kept at 225 C.–230 C. for 120 minutes. The mixture was then cooled to approximately 90 C. and transferred to a heated separation funnel (warm water circulation of 95 C.). The mixture was washed at least six times with about 100 ml hot water (90 C.–95 C.) slowly added from a separation funnel, while stirring at a moderate-to-slow speed (to prevent emulsification). The pH of the mixture was checked afterwards to ensure that all free fatty acids were washed away. The washed mixture was cooled overnight and subsequently dried at 80 C. at a reduced pressure (20 mm Hg) for 1 hour. The yield was about 3150 gram.

The glycerolysed sunflower oil had a composition of diglycerides, triglycerides and monoglycerides in a weight ratio of 5:2:3.

Example 4b 5.5-gram of lecithin (Epikuron 200) and 2.5 gram Cetinol (a commercial ethanol-soluble lecithin fraction from Unimills Zwijndrecht Netherlands) was added to 84.8 gram of glycerolysed sunflower oil (prepared as in example 4a) and 3.1 gram ethanol. 4.1 gram 3M NaCl was added thereto and a clear microemulsion was obtained.

Example 5

4.8 gram of lecithin (Epikuron 200) and 5.2 gram lecithin (Bolec MT) was added to 81.3 gram glycerolysed sunflower oil (prepared as in example 4a) and 4.2 gram ethanol. 4.4 gram 1M NaCl was added and a clear microemulsion was obtained.

Example 6a

Preparation of glycerolysed coconut oil.

In a 1000 ml three-necked flask, equipped with thermometer and glass overhead stirrer, 405.0 gram coconut oil was added to 63.5 gram glycerol and heated. When the mixture reached a temperature of 210 C., 475 milligram sodium stearate was added as a catalyst. The reaction mixture was kept at 225 C.–230 C. for 120 minutes with the first 15 minutes being at a slightly higher temperature of 240 C.–248 C. The mixture was then cooled to approximately 90 C. and transferred to a heated separation funnel (warm water circulation of 95 C.). The mixture was washed six times with 100 ml warm water slowly added from a separation funnel, while stirring at a moderate-to-slow speed (to prevent emulsification). The pH of the mixture was checked afterwards to ensure all free fatty acids were washed away. The washed mixture was cooled overnight and subsequently dried at 95 C. at reduced pressure (20 mm Hg) for 1 hour. The yield was 443 gram.

The glycerolysed coconut oil had a comparable composition of diglycerides, triglycerides and monoglycerides as the glycerolysed sunflower oil of example 4a.

Example 6b 8.4 gram of lecithin (Epikuron 200) was added to 76.2 gram of glycerolysed coconut oil (prepared as in example 6a). 6.1 gram ethanol was added, and 9.3% water could be solubilised, rendering a clear, stable microemulsion. A mole ratio of water to surfactant of 49 was obtained.

Example 7

5.7 gram citric acid ester (Grinsted™ CITREM LR10) was added to 88 gram glycerolysed coconut oil (prepared as in example 6a) and 3.5 gram ethanol. 2.8 gram 3M NaCl in water was added. A clear, transparent microemulsion resulted. A mole ratio of water to surfactant of 15 was obtained.

Example 8

16 gram lecithin (Epikuron 200) was added to 10 gram ethanol and 64 gram Ekona-oil. Adding 10 gram 2 M NaCl in water resulted in a clear microemulsion. A mole ratio of water to surfactant of 27 was obtained.

Example 9a

Preparation of glycerolysed butterfat oil.

In a 4000 ml three-necked flask, equipped with thermometer and glass overhead stirrer, 2601.8 g butterfat was added to 270.3 g glycerol and heated. When the mixture reached a temperature of about 210 C., 2.92 g sodium stearate was added as a catalyst. The reaction mixture was kept at 225 C.–230 C. for 120 minutes. The mixture was then cooled to approximately 90 C. and transferred to a heated separation funnel (warm water circulation of 95 C.). The mixture was washed at least six times with about 100 ml hot water (90 C.–95 C.) slowly added from a separation funnel, while stirring at a moderate-to-slow speed (to prevent emulsification). The pH of the mixture was checked afterwards to ensure all free fatty acids were washed away. The washed mixture was cooled overnight and subsequently dried at 80 C. at a reduced pressure (20 mm Hg) for 1 hour. The yield was about 2900 gram.

The glycerolysed butterfat oil had a comparable composition of diglycerides, triglycerides and monoglycerides as the glycerolysed sunflower oil of example 4a.

Example 9b

To 81.3 g of glycerolysed butterfat oil (prepared as in example 9a) 8.7 g lecithin (Epikuron 200) was added with 4.2 g ethanol. To this mixture 5.8 g water was added. A stable clear microemulsion with a mole ratio of water to surfactant of 29 was obtained.

What is claimed is:

1. An edible water-in-oil microemulsion that is transparent or translucent in appearance, the microemulsion comprising oil, a surfactant, a cosurfactant or cosolvent and a water phase comprising water and optional water-soluble components; wherein the oil comprises from 25 to 97 wt % diglycerides relative to the total weight of glycerides.

2. A microemulsion as claimed in claim 1 wherein the oil comprises from 50 to 85 wt % diglycerides.

3. A microemulsion as claimed in claim 1 comprising from 40 to 97 wt % oil.

4. A microemulsion as claimed in claim 1 comprising from 1 to 40 wt % surfactant.

5. A microemulsion as claimed in claim 4 comprising from 2 to 25 wt % surfactant.

6. A microemulsion as claimed in claim 1, wherein the surfactant is one or more monoglyceride esters or diglyceride esters.

7. A microemulsion as claimed in claim 6, wherein the surfactant is selected from the group consisting of phospholipids and mono- or diglyceride esters of citric acid, tartaric acid and lactic acid.

8. A microemulsion as claimed in claim 7 wherein the surfactant is selected from the group consisting of phospholipids, mono- or diglyceride esters of citric acid and mixtures thereof.

9. A microemulsion as claimed in claim 8 wherein the surfactant is lecithin.

10. A microemulsion as claimed in claim 1 comprising from 0.1 to 25 wt % water phase.

11. A microemulsion as claimed in claim 10 comprising from 1 to 15 wt % water phase.

12. A microemulsion as claimed in claim 1 comprising 0 to 30 wt % cosurfactant or cosolvent.

13. A microemulsion as claimed in claim 12 comprising from 0.1 to 10 wt % cosurfactant or cosolvent.

14. A microemulsion as claimed in claim 1, wherein the mole ratio of water phase to surfactant is in the range of from 5 to 70.

15. A microemulsion as claimed in claim 1, wherein the cosurfactant is one or more non-toxic, amphiphilic molecules.

16. A microemulsion as claimed in claim 15, wherein the non-toxic, amphiphilic molecule has a molecular weight of less than 100.

17. A microemulsion as claimed in claim 15 wherein the cosurfactant is selected from the group consisting of alcohols, acids, esters and mixtures thereof.

18. A microemulsion as claimed in claim 17 wherein the cosurfactant is selected from the group consisting of ethanol, acetic acid, butyl lactate and mixtures thereof.

19. A microemulsion as claimed in claim 1 comprising one or more water-soluble components selected from the group consisting of dairy products, proteins, peptides, salts, sugars, sweeteners, flavouring agents, flavour precursors, nutrients, vitamins, minerals, acids, seasonings and antioxidants.

20. A microemulsion as claimed in claim 1 comprising one or more salts.

21. A process for the preparing a microemulsion according to claim 1 comprising the following steps:
   a) preparing a water phase, including dissolving any water-soluble components in water;
   b) preparing an oil phase, including dissolving any oil-soluble components in oil;
   c) emulsifying the oil and water phases.

22. A food product comprising a microemulsion as claimed in claim 1.

* * * * *